United States Patent Office 3,133,584
Patented May 19, 1964

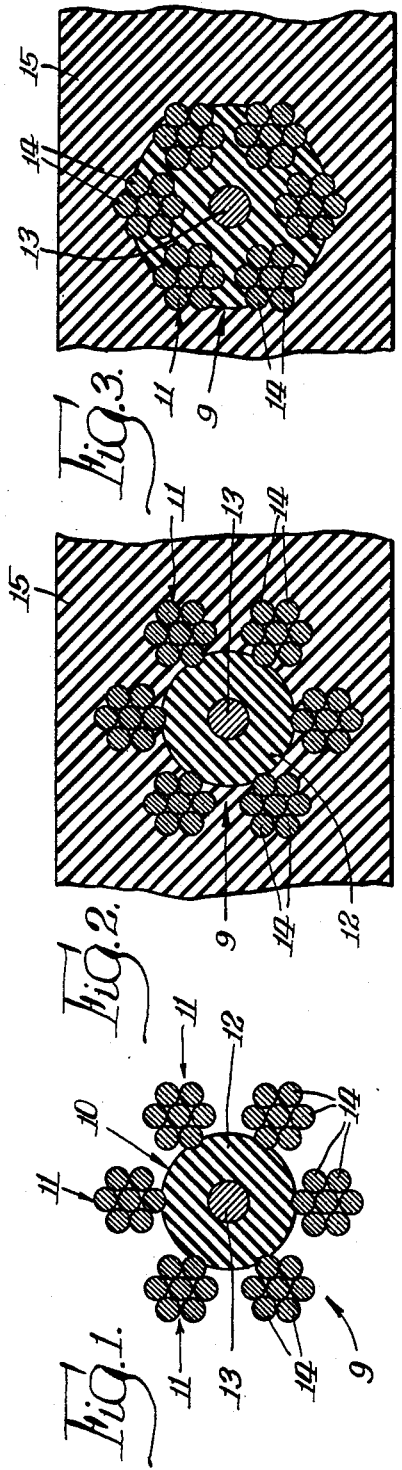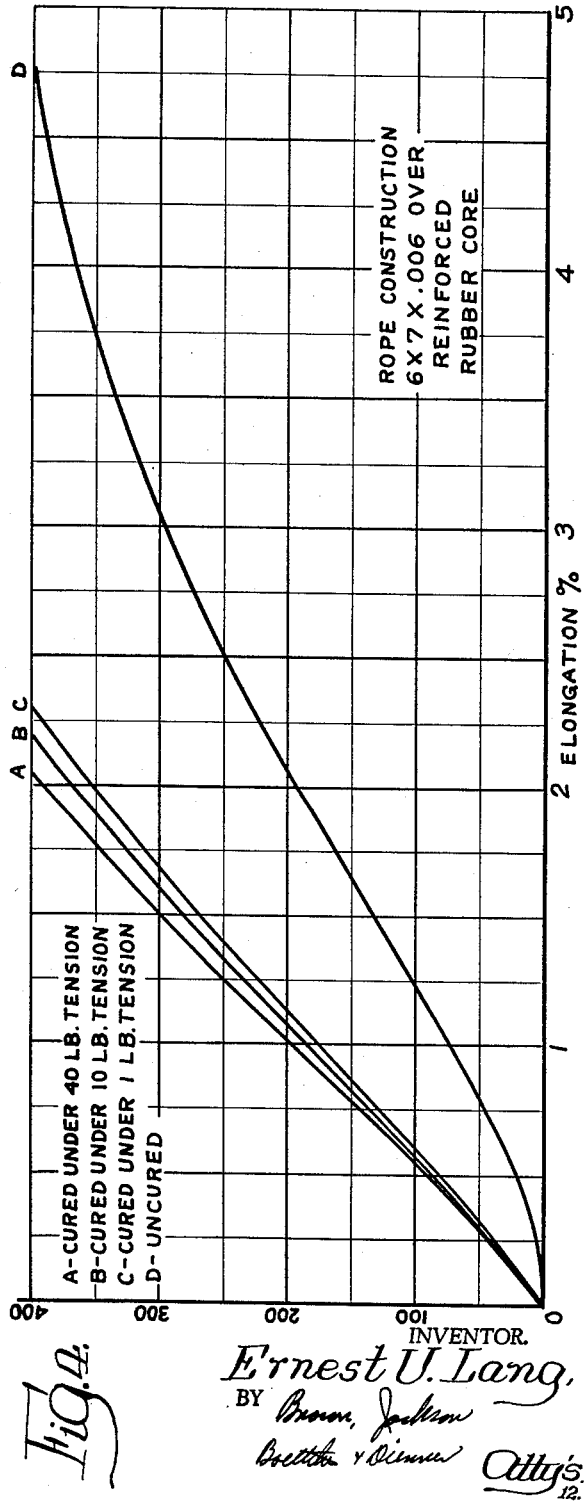

3,133,584
ROPE CONSTRUCTION
Ernest U. Lang, Niles, Mich., assignor to National-Standard Company, Niles, Mich., a corporation of Delaware
Filed July 12, 1962, Ser. No. 209,324
11 Claims. (Cl. 152—359)

My present invention relates generally to ropes, and more specifically to a rope comprising multiple steel strands laid over a rubber core.

It is an object of my invention to provide a rope construction of the charatcer above noted having relatively high and low elongation characteristics before and after curing, respectively, of the rubber core of the rope.

It is a further object of my present invention to provide a rope as before noted which is adapted to be embedded in a rubber article and which has relatively high elongation properties before curing of the rubber article and relatively low elongation properties after curing of the article.

In accomplishing this object, I propose to provide rope comprising a generally cylindrical rubber core reinforced by a central filament and surrounded by a plurality of circumferentially spaced, spirally wound, outer strands, each of which comprises multiple, spirally wound, wires. While the rubber core is in an uncured state, the composite wire rope has high elongation properties. When the uncured wire rope is embedded in a rubber article and placed under tension while the core and rubber article are being cured, the core tends to extrude radially outwardly between the strands, the lay of the strands changes and the rope elongates. Upon completion of the curing of the core and rubber article, further extrusion of the rubber core and elongation of the rope are restricted, and the wire rope thereafter assumes the characteristics of a steel core wire rope.

The above-described rope of my present invention is especially adapted for use in building wire-reinforced rubber tires. When a plurality of such ropes are embedded in a tire carcass, they are free to elongate different amounts as the carcass is expanded into a tire mold and cured. Thus, tires may be built with less accuracy and care than heretofore required, and yet provide a tire comparable to one in which conventional wire ropes are embedded.

It is a feature of my present invention that the reinforcing filament in the rubber core serves to rigidify the latter so that it may be passed, along with the outer strands, through a conventional closer during the formation of the rope.

Now in order to acquaint those skilled in the art with the manner of constructing and using ropes in accordance with the principles of my present invention, I shall describe in connection with the accompanying drawings a preferred embodiment of my invention.

In the drawings:

FIGURE 1 is a cross-sectional view of the wire rope of my present invention as initially formed;

FIGURE 2 is a fragmentary cross-sectional view of a rubber article in which the wire rope of FIGURE 1 has been embedded;

FIGURE 3 is a fragmentary cross-sectional view which corresponds generally to FIGURE 2 and in which the wire rope is in tension; and FIGURE 4 is a graph showing the elongation characteristics of the rope of my present invention under various conditions.

Referring now to FIGURE 1, there is indicated generally by the reference numeral 9 the wire rope of my present invention which, as initially formed, comprises a cylindrical core, indicated generally by the reference numeral 10, surrounded by a plurality of identical, circumferentially spaced apart, spirally wound, outer strands, each of which is indicated generally by the reference numeral 11.

The core 10, which may, by way of example, be about .030 inch in diameter, is formed of a hard tire bead stock 12 reinforced by a central filament or wire 13. The bead stock 12 preferably has a high sulfur and clay filler content so that before curing it is easily extrudable and yet after curing has a Shore Durometer A reading of 75–80. In the specific embodiment of my invention herein disclosed, the reinforcing wire 13 is about .010 inch in diameter and is formed of a material having a very low tensile strength and high elongation properties. A low carbon annealed steel wire has been found to be particularly suitable for this application, although other materials may be used, as for example, nylon strands.

The outer strands 11, which number six in the particular embodiment of my invention disclosed herein, each preferably comprises seven spirally wound wires 14, which individually are .006 inch in diameter. The wires 14 are formed of .70 carbon, hard drawn steel and have a tensile strength of approximately 400,000 p.s.i.

To form the rope 9 of FIGURE 1, wires 14 are first formed into strands 11 by means of a conventional strand forming machine, and then the resultant strands 11 and a core 10 are passed through a conventional closer. During the latter operation, the reinforcing wire 13 serves to strengthen the bead stock 12 so that the core 10 may be passed through the closer in a customary manner. In this connection, I have found that a core of unreinforced bead stock is not sufficiently rigid to be passed through a closer in a manner necessary to form the rope of my present invention.

The rope 9, as shown in FIGURE 2, is adapted to be embedded in a rubber body 15 which may, for example, be part of a tire carcass. As contrasted with bead stock material described hereinbefore, tire carcass material after curing has a Shore Durometer A reading of 50–60. The rope 9 is fabricated with the tire carcass material 15 while both members are in an uncured state. When the rope 9 is uncured, it has high elongation properties; as shown by curve D in FIGURE 4, the uncured wire rope 9 has 4.75% elongation under a load of 400 pounds.

As the tire carcass 15 is expanded into a tire mold, tension is imposed on the rope 9 embedded therein. The magnitude of the tensile force will depend upon the degree of expansion of the carcass 15 and the location of the rope 9. In response to tension, the rope 9 will tend to elongate as the lay of the strands 11 changes and the core 10 extrudes radially outwardly between the strands 11. Under relatively low tension, the core 10 will extrude radially outwardly only slightly from its normal periphery shown in FIGURE 2; under relatively high tension, the strands 11 will move radially inwardly and the core 10 will extrude radially outwardly to substantially fill the spaces between the strands 11 as shown in FIGURE 3. Although I have shown only one rope 9 in the carcass 15, it will be readily appreciated that in the molding of a conventional tire, a plurality of ropes 9 are embedded in the carcass 15. Due to the unique properties of the ropes 9, each is free to elongate a different amount in response to the differing tensions at various locations about the carcass 15.

After the tire carcass 15 has been fully expanded into the tire mold, both the carcass 15 and the bead stock 12 of the core 10 are cured. Thereafter, since the core 10 can no longer extrude radially outwardly, the rope 9 assumes the characteristics of a steel core wire rope. As graphically shown by curves A, B, and C in FIGURE 4, when the rubber core of rope 9 is cured under tension, varying from one to forty pounds, the percent elongation of the rope under a load of 400 pounds is less than one-half of the percent elongation of the wire rope under a corresponding load prior to curing.

From the foregoing description, it will be noted that I have provided a unique type of rope which has relatively high elongation properties before curing and relatively low elongation properties after curing. It will also be understood that the incorporation of my rope in a tire carcass obviates the great accuracy and core heretofore required in building wire-reinforced rubber tires. Finally, applications for my rope in other fields wherein similar problems may exist will suggest themselves to those skilled in the art.

While I have shown and described what I believe to be a preferred embodiment of my present invention, it will be readily apparent to those skilled in the art that various modifications and rearrangements may be made therein without departing from the spirit and scope of my invention.

I claim:

1. A rope comprising a rubber core characterized by being extrudable before curing and non-extrudable after curing, a plurality of spirally wound steel strands surrounding said core, said strands being disposed in circumferentially spaced relation with respect to each other around said core, and said rope, when under tension, being characterized in the uncured and cured states of said rubber core by being of relatively high and low elongation, respectively.

2. In a rope, core means comprising rubber characterized by being of low tensile strength, extrudable before curing, and non-extrudable after curing, a plurality of spirally wound strands each comprising a plurality of steel wires of high tensile strength as compared with said core means, said strands being disposed in circumferentially spaced relation with respect to each other around said core means, and said rope, when under tension, being characterized in the uncured and cured states of said rubber of said core means by being of relatively high and low elongation, respectively.

3. A rope comprising a rubber core characterized by being extrudable before curing, and non-extrudable after curing, a plurality of spirally wound steel strands surrounding said core, said core before curing being adapted to extrude radially outwardly between said strands to permit relatively high elongation of the rope as tension is applied to the latter, and after curing of said core relatively low elongation of the rope as tension is applied to the same.

4. A rope comprising a rubber core with an outer diameter of about .030 inch and characterized by being extrudable before curing, and non-extrudable after curing, a plurality of spirally wound strands surrounding said core, each of said strands being formed of a plurality of spirally wound .70 carbon hard drawn steel wires .006 inch in diameter, and said rope, when under tension, being characterized in the uncured and cured states of said rubber core by being of relatively high and low elongation, respectively, and by the wires of said strands being relatively movable and immovable with respect to each other, respectively.

5. A rope comprising a rubber core with an outer diameter of about .030 inch and characterized by being extrudable before curing, and non-extrudable after curing, a low carbon annealed steel wire about .010 inch in diameter extending through said core for reinforcing the same, a plurality of spirally wound strands surrounding said core, each of said strands being formed of a plurality of spirally wound .70 carbon hard drawn steel wires .006 inch in diameter, and said rope, when under tension, being characterized in the uncured and cured states of said rubber core by being of relatively high and low elongation, respectively, and by the wires of said strands being relatively movable and immovable with respect to each other, respectively.

6. A rope comprising a rubber core characterized by being extrudable before curing, and non-extrudable after curing, a plurality of spirally wound steel strands surrounding said core, said core before curing being adapted to extrude radially outwardly between said strands to permit elongation of the rope as tension is applied to the latter, said core after curing having a Shore Durometer A reading of 75–80, and said core after curing thereof preventing substantial elongation of the rope by tension applied to it.

7. A rope comprising a rubber core with an outer diameter of about .030 inch and characterized by being extrudable before curing, and non-extrudable after curing, a low carbon annealed steel wire about .010 inch in diameter extending through said core for reinforcing the same, a plurality of spirally wound strands surrounding said core, each of said strands being formed of a plurality of spirally wound .70 carbon hard drawn steel wires .006 inch in diameter, said core before curing being adapted to extrude radially outwardly between said strands to permit elongation of the rope as tension is applied to the latter, and said core after curing preventing substantial elongation of the rope by tension applied to it.

8. In combination with a rubber body, a rope embedded therein, said rope comprising a rubber core characterized by being extrudable before curing, and non-extrudable after curing, a plurality of spirally wound steel strands surrounding said core, said strands being circumferentially spaced apart, and said rope when under tension in said rubber body being characterized in the uncured and cured states of said rubber core by being of relatively high and low elongation, respectively, and thereby, correspondingly, permit and prevent elongation of said rubber body.

9. In combination with a rubber body, a rope embedded therein, said rope comprising a rubber core characterized by being extrudable before curing, and non-extrudable after curing, a low carbon annealed steel wire extending through said core for reinforcing the same, a plurality of spirally wound strands each formed by a plurality of steel wires surrounding said core and said rope when under tension in said rubber body being characterized in the uncured and cured states of said rubber core by being of relatively high and low elongation, respectively, and thereby, correspondingly, permit and prevent elongation of said rubber body.

10. In combination with a tire carcass, a rope embedded therein, said rope comprising a core of tire bead stock with an outer diameter of about .030 inch and characterized by being extrudable before curing, and non-extrudable after curing, a low carbon annealed steel wire about .010 inch in diameter extending through said core for reinforcing the same, a plurality of spirally wound strands surrounding said core, each of said strands being formed of a plurality of spirally wound .70 carbon hard drawn steel wires .006 inch in diameter, and said rope when under tension in said rubber body being characterized in the uncured and cured states of said rubber core by being of relatively high and low elongation, respectively, and thereby, correspondingly, permit and prevent elongation of said rubber body.

11. In combination with a tire carcass, a rope embedded therein, said rope comprising a rubber core characterized by being extrudable before curing, and non-extrudable after curing, a plurality of spirally wound steel strands surrounding said core, said core before curing being adapted to extrude radially outwardly between said strands to permit elongation of the rope as tension is applied to the latter during forming of the tire carcass, said tire carcass after curing having a Shore Durometer A reading of 50-60, said core after curing having a Shore Durometer A reading of 75-80, and said core after curing preventing substantial elongation of the rope and said body of rubber by tension applied to the same.

References Cited in the file of this patent

UNITED STATES PATENTS

| 2,038,548 | Domm | Apr. 28, 1936 |
| 2,106,060 | Ostrander | Jan. 18, 1938 |

FOREIGN PATENTS

| 562,137 | Great Britain | June 20, 1944 |
| 1,098,840 | Germany | Feb. 2, 1961 |

OTHER REFERENCES

The Story of Tire Beads and Tires; prepared by National-Standard Co., published by McGraw Hill Book Co., 1954 edition, page 137 relied upon—cited as—Tire Beads.